Nov. 19, 1940.   W. W. KRAFT   2,222,565

CONTACT DEVICE

Filed Feb. 13, 1940

INVENTOR
Wheaton W. Kraft
BY Nathaniel Ely
ATTORNEY

Patented Nov. 19, 1940

2,222,565

UNITED STATES PATENT OFFICE 2,222,565

CONTACT DEVICE

Wheaton W. Kraft, Bronxville, N. Y., assignor to The Lummus Company, New York, N. Y., a corporation of Delaware Application February 13, 1940, Serial No. 318,720

1 Claim. (Cl. 261—76)

This invention relates to improvements in contact devices used in fractionation, distillation, absorption, extraction, stripping, and the like operations.

In the separation of mixtures by any one of the above methods, it is desirable to secure as intimate a mixing as possible of the counterflowing light and heavy fluids so that a highly efficient and effective separation may be obtained. Intimacy of mixing, furthermore, is an important factor in the determination of both the diameter and the height of the apparatus used. These features are of particular importance in the design of fractionation and absorption columns since in such operations it is primarily the allowable vapor velocity and the fractionation or absorption efficiency which control the dimensions of the column.

As the principal feature of my invention, I provide an improved type of liquid-vapor contact device for a fractionating column or the like in which the velocity of the rising vapors is effectively utilized to improve the contact between vapor and liquid so that a more efficient fractionation results. Heretofore, so far as I am aware, particularly in fractionating columns and the like operated under pressure, no use has been made of the kinetic energy of the rising vapors to produce an intimate mixing of the vapors with the liquid.

A further object of my invention is to provide a fractionating column or the like adapted to operate under pressure with liquid-vapor contact devices utilizing the principle of the injector so that the velocity of the vapors may be utilized to effect a superior mixing of the liquid with the vapor whereby more efficient fractionation is obtained and a material reduction in the size of the column is effected.

Another and more specific object of my invention is to provide a fractionating column or the like operated above atmospheric pressure with a liquid-vapor contact device having an injector-type vapor uptake by means of which the rising vapors flowing through the uptake at a relatively high velocity cause the liquid on each deck to form a spray therewith, so that an intimate mixture of the vapors with the liquid and a thorough circulation of the liquid on each deck are obtained.

Further objects and advantages of my invention will appear from the following description of a preferred form of embodiment thereof taken in conjunction with the attached drawing, of which:

Figure 1:
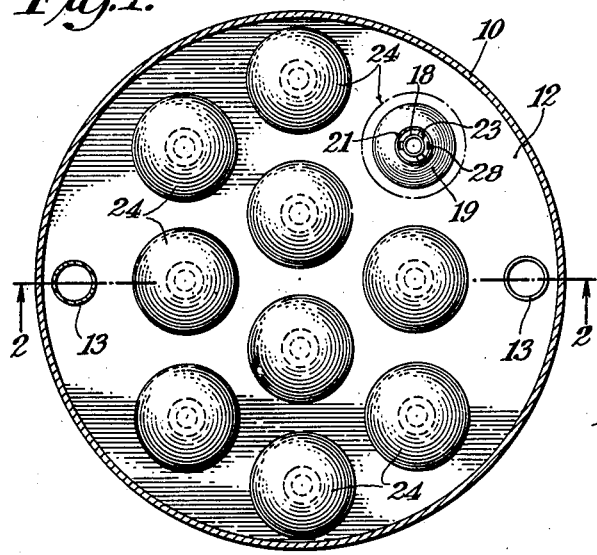
Fig. 1 is a horizontal sectional view of the fractionating column taken substantially along the line 1—1 of Fig. 2.

In accordance with my invention, I have illustrated a fractionating column which is provided with a plurality of spaced fractionating plates or decks 12 for the collection of downflowing liquid thereon so that establishment of the appropriate equilibrium conditions between the rising vapors and the liquid can be approached. Each plate is provided with the customary downpipe 13, by means of which the liquid in the column flows from plate to plate. This downpipe extends the requisite distance above plate 12 so that the liquid thereon is maintained at a sufficient depth. Downpipe 13 also extends such a distance below the plate 12 that its lower end 15 is below the surface of the liquid maintained on the plate below, whereby a seal is formed to prevent the flow of vapors upwardly through the downpipe.

As the rising vapors come into contact with the liquid maintained on each plate 12, at any particular plate the higher boiling components of the vapors are condensed, and the lower boiling components of the liquid are vaporized. This process makes it possible to separate a mixture of two or more components fed to the column into fractions comprising the lower and the higher boiling components respectively; in addition, fractions representing components having intermediate boiling points may be withdrawn from the column as side streams.

For efficient fractionation of a mixture, it is necessary that an intimate mixing of the vapors with the liquid trapped on each plate be obtained; for it is the intimacy of contact of the rising vapors with the downflowing liquid that determines the degree of fractionation accomplished. In accordance with a preferred form of embodiment of my invention, I accomplish a most intimate mixing of vapors with liquid by means of a contact device of either of the types more particularly illustrated in Figs. 3 or 4.

The improved contact device shown in Figs.

1 to 3 includes an uptake conduit 16 of desired cross-sectional shape, fastened in any suitable manner to the plate 12 and in communication with an aperture 17 of corresponding cross-sectional shape and area in the plate 12. The conduit 16 extends upwardly from the plate 12 to a point a short distance below the level of liquid maintained on said plate by downpipe 13. The cross-sectional area of conduit 16, greatest at the aperture 17 in the plate 12, preferably diminishes as the liquid level is approached. The upper portion 18 of the conduit may be so constructed that its cross-sectional area remains constant throughout its height.

An outer conduit 19 of similar but somewhat greater cross-sectional area surrounds conduit 16. This outer conduit may be conveniently positioned in relation to conduit 16 by means of bracing members 23. Conduit 19 also diminishes in cross-sectional area with its height. The two conduits thus form a passage through which liquid can flow as will hereinafter be described. If desirable, conduit 19 may diminish more rapidly in cross-sectional area than conduit 16 so that a passage of decreasing cross-sectional area is formed.

The lower end 20 of conduit 19 preferably terminates a short distance above plate 12 as shown, sufficient space being provided, however, so that a free flow of liquid thereunder is obtained. The upper portion 21 of conduit 19 is also preferably constructed so that it has a constant cross-sectional area similar to that of the upper portion 18 of conduit 16. This upper portion 21 is longer than the upper portion 18 and preferably extends a short distance above the liquid level. The upper portions of these two conduits form a mixing chamber or space generally designated at 22.

The two superposed conduits comprising my improved contact device preferably have a common axis. Although the type of contact device shown in Figs. 1 to 3 comprises two concentric substantially frusto-conical conduits, it will be understood that any other form of conduits such as nozzles may also be used. The conduits shown are preferably cylindrical in shape at their upper ends, the outer conduit being longer than the inner one, whereby a chamber 22 is formed for the mixing of vapors with liquid.

The operation of the contact device is as follows: Column 10 is maintained under such a pressure that vapors flow through conduit 16 at a relatively high velocity. Since the pressure energy of the vapors is changed to kinetic energy during the passage of the vapors through conduit 16, the pressure in conduit 16 and in chamber 22 is considerably less than the pressure external thereto. Consequently, a flow of liquid is induced by injector action through the passageway formed by the two conduits 16 and 18, and a mixing of the liquid with the vapors is effected in the mixing chamber 22. Because of the high velocity at which the vapors are traveling, a turbulent mixing effect is produced whereby an intimate mixture of liquid and vapors is formed and a better fractionation is obtained. These results are obtained by virtue of the fact that the high velocity vapors break up the liquid stream into finely divided particles, i. e., the vapors tend to atomize the liquid.

It will be appreciated that the vapors in their passage through this contact device will tend to entrain a portion of the liquid, which should be knocked out of the vapor stream before it progresses further. By means of a suitable staggered arrangement of rows of these contact devices on alternate decks, it may be possible to effect a separation of the entrained liquid from the vapors. However, I have found that it is more practicable to provide for each individual contact device some sort of baffle arrangement whereby the separation of entrained liquid particles may be accomplished.

Accordingly, I provide a cap or baffle 24 which surmounts conduits 16 and 19. The surface of this cap preferably slopes downwardly and outwardly from the center thereof, and the maximum cross-sectional area is somewhat greater than that of conduit 19. The lower edge 25 of this cap is above the liquid level and may be either above or below the upper edge 26 of conduit 19. Supporting members 28 may be provided so that the cap 24 may be conveniently fastened to conduit 19.

Baffle 24, which is positioned a short distance above conduit 21, serves to reverse sharply the direction of flow of the vapor stream and thereby to knock out the entrained liquid, which collects on the surface of the baffle and coalesces thereon. This liquid flows along the downwardly sloping surface of the baffle and tends to drop off into the liquid below. So that the vapors passing out from under the baffle will not have to pass through the liquid screen that would be thus produced, the liquid is preferably allowed to collect in a gutter or channel 29 and to drop down to the liquid below in one or two small streams. For this purpose, gutter 29 may be provided with one or more notches 29a as desired.

It will be seen that the liquid nearest the plate will flow into the passageway between the two conduits first and that a continuous circulation of all the liquid on the plate will thereby be effected. This circulation is produced primarily by two causes: the induced flow of liquid caused by the injector action of the flow of vapors through conduit 16 and the consequent atomization or breaking up of the liquid stream, and the syphon effect resulting from the difference in liquid densities created by the flow of the vapors.

A deck provided with a plurality of these contact devices acts somewhat like a modified perforated plate. It eliminates, however, the bumping and surging effects occurring when a perforated plate column is operated at low capacity.

In comparison with the customary types of bubble caps and the like, I find that the use of my improved contact device effects a reduction in size of the equipment necessary to carry out the fractionation. Because of the higher allowable vapor velocity and the more intimate mixing accomplished, a column of smaller diameter may be employed. It will be found that, for a given fractionation, the column height will be somewhat less because of the more efficient fractionation obtained. It is also possible to space these contact devices closer together on a plate since less area is required for each contact device.

Figure 3:
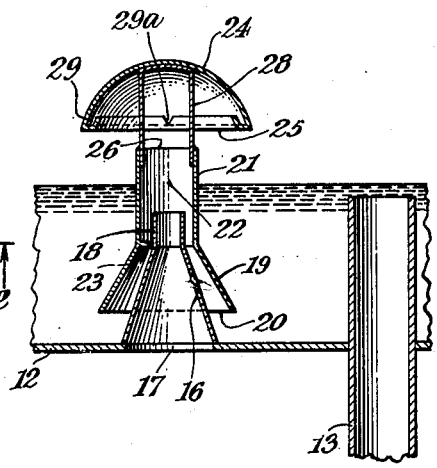
Fig. 3 is an enlarged, vertical, sectional view of my improved contact device.
Figure 2:
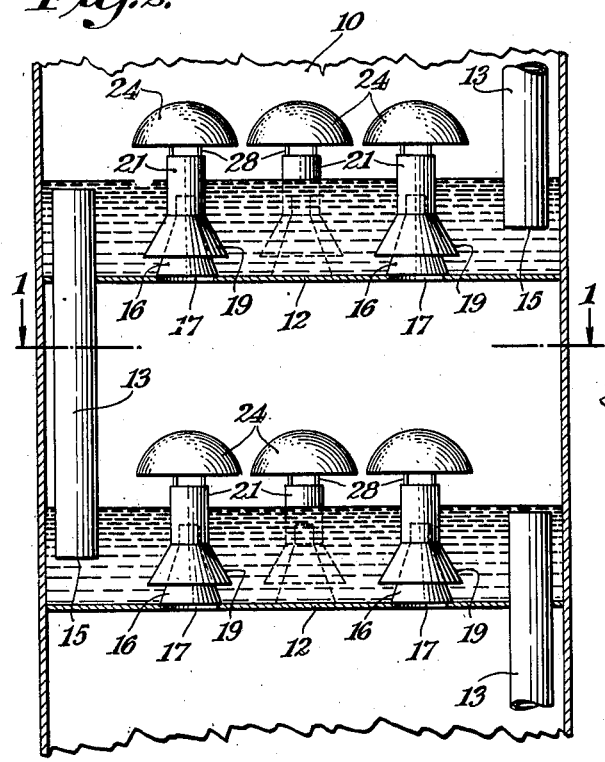
Fig. 2 is a vertical section through a fractionating column taken substantially along the line 2—2 of Fig. 1.
Figure 4:
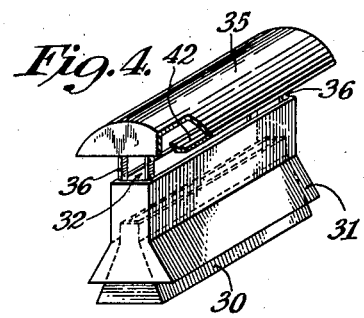
Fig. 4 is an enlarged, perspective view of a modified form of my contact device.
Figure 5:
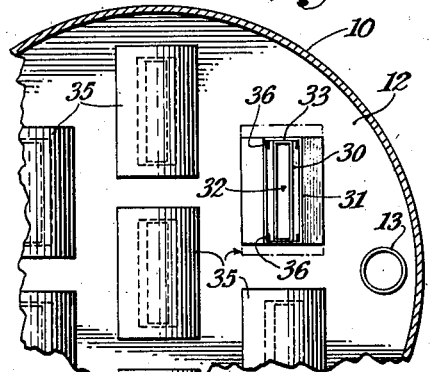
Fig. 5 is a partial horizontal sectional view of a fractionating column provided with the form of contact device shown in Fig. 4.

Although the form of embodiment of my improved contact device shown in Figs. 2 and 3 is substantially conical, any other suitable form may also be used. For example, I may make my contact device rectangular in form as shown in Figs. 4 and 5.

This form of embodiment comprises a conduit 30 and a conduit 31 each of rectangular cross-sectional area. Their construction is such that they form a mixing chamber or space 32 similar to chamber 22. Preferably the conduits are fastened together at their ends as at 33. A cap 35 surmounts conduit 31 and is fastened thereto by means of supporting members 36. A gutter 42, conveniently open at the ends, is provided to allow the liquid coalescing on cap 35 to drop down.

It is also within the scope of my invention to use this device for liquid-liquid contacts such as solvent extraction, absorption, and the like. The construction and operation of the contact device would in such cases be substantially the same.

While I have shown preferred forms of embodiment of my invention, I am aware that modifications may be made thereto, and I, therefore, desire a broad interpretation of my invention within the scope and spirit of the description herein and of the claim appended hereinafter.

I claim:

In combination with an apertured deck for use in fractionating columns and the like, said deck having a downpipe to maintain a depth of liquid thereon, a contact device including two separate, concentric conduits of relatively uniform thickness, the inner conduit comprising a fluid uptake conduit in communication with an aperture in said deck, said inner conduit terminating at a point below the liquid level on said deck, the outer conduit being of greater cross-sectional area than the uptake conduit and forming therewith a passageway for liquid, the lower edge of said outer conduit being positioned above and out of contact with said deck, the lower portion of each conduit having a cross-sectional area which decreases at a constant rate with height and the upper portion of each conduit having a cross-sectional area which remains constant with height, the upper portion of the outer conduit extending above the liquid level and forming a mixing chamber, and the upper portions of each conduit being partly coextensive, whereby liquid is induced to flow through said passageway by the flow of fluid through said uptake conduit and to intimately mix with the fluid in said mixing chamber, means to position the outer conduit with relation to the inner conduit, a baffle to separate entrained liquid from the fluid, means to support said baffle above the conduits, the surface of said baffle sloping downwardly and outwardly from the center thereof, and flange-like means on the inner edge of said baffle and projecting upwardly therefrom to collect and remove the entrained liquid separated from the fluid passing outwardly from said contact device.

WHEATON W. KRAFT.